INVENTOR.
Ralph H. Lovberg
Louis C. Burkhardt

INVENTOR.
Ralph H. Lovberg
Louis C. Burkhardt

United States Patent Office 3,047,480
Patented July 31, 1962

3,047,480
PLASMA DEVICE UTILIZING SELF-TRAPPING OF PLASMA CURRENT AND MAGNETIC FIELD
Ralph H. Lovberg and Louis C. Burkhardt, Los Alamos, N. Mex., assignors to the United States of America as represented by the United States Atomic Energy Commission
Filed July 30, 1958, Ser. No. 752,148
3 Claims. (Cl. 204—154.2)

The present invention relates to fusion reactors, and is more particularly directed to novel methods and means for transmuting a portion of the externally supplied electromagnetic energy into thermal plasma energy.

*Definitions*

Before disclosing the details of the present invention, we consider it advisable to list the meanings we attach to certain words and phrases used herein. This is considered necessary in the interest of clarity, for otherwise inferences may be drawn which we do not intend to imply.

*Controlled.*—Operable in a pre-determined manner to produce that which can be contained, or released without hazard. Main implication is that energy and radiations are not released violently or explosively.

*Fusion reactor.*—Apparatus operable to produce from the reaction of two or more thermonuclear fuel nuclides of mass number A one or more nuclides of mass number $A+X$, where $X \geq 1$. Although it is implied that the rate of such reactions increases as the relative velocities of such particles at the time of collision, nothing is implied about the means by which such pre-collision velocities are attained. The same reaction may and usually does produce one or more other particles such as neutrons or protons, in accordance with well-known reactions.

*Thermonuclear reactor.*—Apparatus in which fusion reactions occur primarily as the result of random collisions within the apparatus between gas particles having a Maxwellian distribution of velocities about some average temperature. It is implied that such reactions are not the result of accelerating one particle into another. While it is also implied that a high average gas temperature is sought for to attain a high thermonuclear reaction rate, nothing is implied as to the attainment of any minimum temperature.

*Net power-producing thermonuclear reactor.*—A thermonuclear reactor operable to make available for external use more energy per cycle of operation than is consumed in operating it. No restriction is implied as to the form of form of such energy, with only irretrievable losses such as radiation losses past all heat exchanger coolant channels, moderator blankets, etc., and thermal losses within the device being deducted. This usage appears to be justifiable even when all energy available for external use is the low grade form of energy, heat, and all of the energy supplied is electrical, as a net gain of the former over the latter obviously makes such apparatus superior to electrical heaters of the resistive conductor type.

*Net electrical power-producing thermonuclear reactor.*—This expression is reserved for thermonuclear reactors in which more electrical energy per cycle of operation is returned to the electrical system used to operate the reactor than such system supplied during such cycle, with the reservation that there may be a net loss for some cycles if the energy balance over a large number of cycles results in a net gain of energy.

*Plasma.*—A gaseous medium in which the original atoms have been at least partially ionized, i.e., separated into positive ions and electrons. While the unmodified expression does not imply a complete stripping of all originally neutral particles, this is to be understood when the temperature of the gas is such that no other state is possible.

*Ion.*—A gas particle having a net positive charge, i.e., stripped of at least one electron, including both atoms and molecules thus stripped. It is not used herein to include electrons.

*Thermonuclear fuel.*—Any mixture of the light element nuclides in which fusion reactions are known to occur, specifically deuterium, tritium, deuterium and tritium, helium-3 and deuterium, lithium-6 and deuterium, and lithium-7 and hydrogen-1.

Prior art devices such as those disclosed in the copending applications of Kruskal et al., SN 685,771, and now Patent No. 3,016,342, and Phillips et al., SN 743,220, and now Patent No. 2,991,238, both of which are also assigned to the Government of the United States of America utilize the "intermixing heating" effect, i.e., the mechanism whereby the azimuthal magnetic flux surrounding a pinched plasma discharge and a longitudinal magnetic flux inside the pinch diffuse throughout the entire plasma to transfer a part of their stored energy into kinetic energy of the plasma particles. To maximize this mechanism, the pinched discharge is short-circuited or "crowbarred" through an external switch and a low-resistance path at the peak of the current wave, when the azimuthal flux and the azimuthal stored magnetic energy are maximum (the longitudinal magnetic flux being separately supplied and essentially constant although its energy is increased by the pinch compression). The effect of this crowbarring is to cause a slow exponential decay of the pinched plasma current and its azimuthal flux with a relatively large time constant, thereby furnishing the time necessary for the aforementioned intermixing heating.

This intermixing heating effect can be more clearly understood by considering a simplified example. Imagine a pinch containing a uniform longitudinal field $B_z$ and occupying half the volume V of a torus. Outside the pinch is a uniform azimuthal field $B_\theta$ of equal magnitude occupying the remaining half of the volume. The thin current sheath in the outside boundary of the pinch cleanly separates one field from the other. Now suppose the intermixing to be complete so that a single uniform field is established, consisting of lines spiralling throughout the entire length of the reactor. Then, since energy density equals $B^2/8\pi$, $$W_0 = \frac{B_z^2}{8\pi} \times V/2 + \frac{B_\theta^2}{8\pi} \times V/2 = \frac{B_0^2}{8\pi} V$$

with $B_0 = B_z = B_\theta$ and $W_0$=original energy in magnetic fields, prior to intermixing, $Wf$=final energy in magnetic field, after intermixing.

After intermixing, $B_z = B_0/2$ and $B_\theta = B_0/2$. These combine vectorially to give a single final flux density $$B_f = \sqrt{(B_0/2)^2 + (B_0/2)^2} = B_0/\sqrt{2}$$

Then $$W_f = \frac{(B_0/\sqrt{2})^2 V}{8\pi} = 1/2 B_0^2 / 8\pi V = 1/2 W_0$$

In the absence of any other medium to absorb the difference in energy, $W_0 - Wf = 1/2 W_0$ is absorbed by the plasma in ohmic heating.

While the methods disclosed in the above-mentioned patent applications may be workable, the technical problems associated with crowbar switching are quite difficult. The switch must not only have extremely low inductance, but it must be capable of closing with nearly zero voltage across it, and must be capable of carrying large currents for long periods of time without damage. At the present time, there are serious difficulties in the use of paralleled banks of either ignitrons or spark gaps in satisfying these requirements.

In the process of investigating field configurations and pinch stability in a coaxial linear discharge machine generally of the type described in J. App. Phys. 28, 519–521 (May 1957) but of somewhat larger bore (13 cm.), the present inventors have discovered a new phenomenon, that of self-crowbarring of a pinch. In this device, operated with a $B_z$ of 1750 gauss and a deuterium filling of 40 microns Hg, and powered by a 75 μfd. capacitor bank charged to 15 kv. through coaxial cables having 0.08 μh. inductance, a peak current of $2 \times 10^5$ amperes is obtained in a rise time of about 6 microseconds. The usual behavior of such machines, in the absence of crowbarring, is oscillatory, with currents and voltages in the nature of an exponentially damped sinusoids. This behavior is typical of smaller bore machines and was expected in the one under discussion.

Contrary to our expectations, a circulating current of magnitude of $5 \times 10^4$ amperes was discovered inside the plasma at the time the current at the machine terminals passed through zero. Magnetic probe measurements indicated that this circulating current passed through the pinched core of the plasma and returned on the surface just inside the insulation which shields the return conductor from the plasma. The phenomenon appears to be caused by the radiations emitted by the pinched plasma. These radiations evidently ionize and heat the gas outside the pinch, thereby making it highly conductive. The azimuthal or $B_\theta$ flux external to the pinch is now embedded in a conductive medium and is unable to decay in accordance with the requirements of the external capacitor circuit. Its decay is rather determined by the characteristic penetration time constant of the plasma in which it is contained. The current requirement of the external circuit is met by the establishment of a negative current layer on the outside surface of the plasma. The phenomenon is analogous to the interruption of a direct current flow through a thick conductor, wherein the current deep in the conductor continues to flow and the requirement of a net zero current is met by the establishment of a negative skin current.

The results of the present inventors' work on the above-mentioned linear discharge machine have been reported in Nature 181, 228–230 (Jan. 25, 1958), together with neutron yields in the range of $10^3-10^5$ per discharge which indicated the occurrence of fusion reactions at or near the peaks of discharge current. We are now prepared to disclose methods and means for more fully exploiting our discovery.

It is therefore an object of the present invention to provide methods and means for trapping the magnetic field energy of a pinched plasma.

It is a further object to provide methods and means for containing the magnetic field energy of a fusion reactor utilizing the principle of intermixing heating within such plasma without the use of external crowbar switching means.

An additional object is to provide methods and means to promote and exploit the phenomenon of self-trapping of the magnetic field of a pinched plasma in a fusion reactor utilizing the principle of intermixing heating to raise the temperature of such plasma.

An additional and further object is to provide methods and means for obtaining fusion reactions in a pinched plasma reactor by trapping the magnetic energy associated with the pinch current and utilizing such energy to raise the temperature of such plasma.

Another object is to thus obtain fusion reactions by such methods and means and thus to utilize such means as a source of neutrons and other radiations.

The above and other objects are accomplished by constructing a fusion reactor in accordance with the following inequality, deduced by the present inventors from simple order-of-magnitude calculations. The ordinary skin depth formula gives the dependence of δ, the depth of penetration of a current of frequency ω into a conductor of conductivity σ, resistivity ρ, as $$\delta = 1/\sqrt{\mu\sigma\omega} = \sqrt{\rho/\mu\omega} \text{ (MKS units)}$$

Setting $\delta = r$, $\omega = 1/\tau_p$ and $\mu = \mu_0$, the net result is that azimuthal magnetic field energy entrapment can be expected if $$\tau_b < \frac{\mu_0 r^2}{\rho} = \tau_p$$

where $\tau_b = 2\pi\sqrt{LC}$ = period of driving circuit, L being the series inductance of the leads and the pinched plasma and C the bank capacitance, $r$ = the discharge tube radius, i.e., to the inside of the insulator within the conductive return shell, $\rho$ = the plasma resistivitiy external to the pinch, in ohm-meters, $\mu_0$ = the permittivity of free space = $4\pi \times 10^{-7}$ henries/meter, $\tau_p$ = the approximate time constant for decay of the entrapped current.

Obviously a high value of $\tau_p$ compared with $\tau_b$ will favor entrapment more than a $\tau_p$ only slightly greater than $\tau_b$. It is therefore clear that the conductivity of the plasma should be high (or resistivity low) and that the tube should be of large bore. $\tau_b$ can be minimized, of course, by keeping the capacitance of the bank and the lead inductance as low as possible.

To better understand the various physical embodiments of our invention, a number of schematic figures are presented in the accompanying drawings, hereby incorporated in the present specification by reference. In these drawings.

Figure 1:
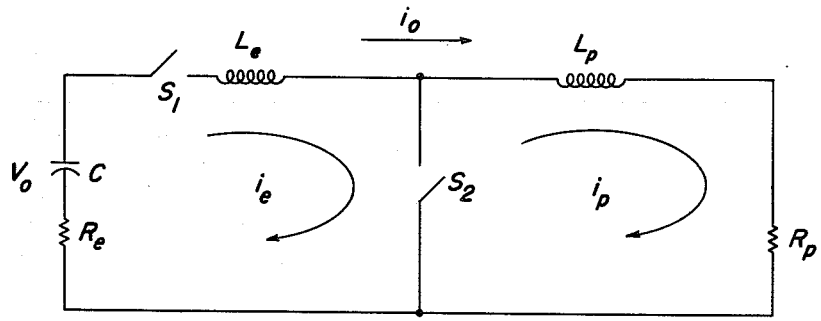
FIGURE 1 is a sketch of the equivalent electrical circuit of our invention.

Turning now to FIGURE 1, C represents the capacitance of the storage bank used to supply power to the reactor, $L_e$ represents the inductance of the connecting leads, and $R_e$ the total resistance of the external circuit. In the open circuit position of the switches as shown, the capacitor is preliminarily charged to a voltage $V_0$ by conventional means not shown. $L_p$ and $R_p$ are similarly the inductance and resistance of the load, in this case the pinched plasma.

Switch $S_1$ is closed and the current $i_0$ is allowed to rise to a maximum. If switch $S_2$ were left open, this current would vary sinusoidally, damped by the circuit resistance and ringing with a frequency of $\frac{1}{2}\pi\sqrt{LC}$ in accordance with the well-known transient behavior of RLC circuits, where $L = L_e + L_p$. However, shorting switch $S_2$ is closed at peak $i_0$, when its $B_\theta$ is also a maximum, effectively isolating the load from its power supply. At such time, the voltage across switch $S_2$ is a minimum ($Ldi/dt = 0$), but the energy stored in the azimuthal field of the pinch current is a maximum, $\frac{1}{2}L_pI^2$. Since the capacitor voltage at such time is nearly zero, the capacitor energy storage $W_c$ is approximately zero and the fraction of the original capacitor energy $W_{co}$ trapped in the load $W_p$ is $$\frac{W_p}{W_{co}} = \frac{1/2 L_p I^2}{1/2 L_p I^2 + 1/2 L_e I^2} = \frac{L_p}{L_p + L_e}$$

Figure 2:
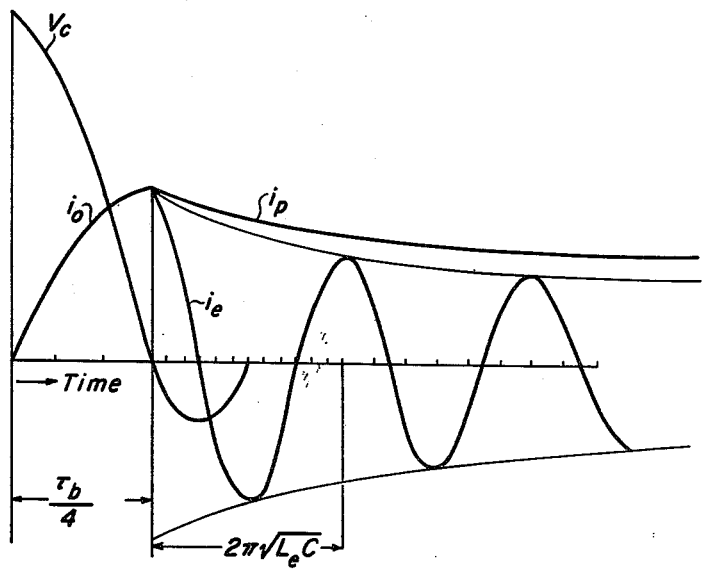
FIGURE 2 is a sketch of the current and voltage relationships in the operations of reactors embodying our invention.

The current and voltage relationships of FIGURE 2 illustrate the behavior of the apparatus under the above-described sequence of operations. At time $\tau_b/4$, the rise time of the series circuit, switch $S_2$ is closed. Thereafter the external circuit rings with its original amplitude as diminished by only $R_e$ attenuation and with a new frequency $$\frac{1}{2\pi\sqrt{L_eC}}$$

Note that the new voltage amplitude is only $$\sqrt{\frac{L_e}{L_e+L_p}}V_0$$

as can be seen by considering that the maximum energy transferred back and forth between C and $L_e$ is $$1/2CV^2 = 1/2L_eI^2 = \frac{L_e}{L_e+L_0} \times 1/2CV_0^2$$

The important consideration for present purposes is that circulating current $i_p$ in the plasma decays exponentially with the time constant $$\tau_p = L_p/R_p$$

which should be as large as possible to accomplish the purposes of the present invention.

The above-described situation is, of course, an idealized one, as the physical counterpart of the short-circuit path through switch $S_2$ is the path followed by the circulating current over the outside surface of the plasma. This path can never be completely without resistance, though it can be minimized relative to the other circuit resistances.

Figure 3:
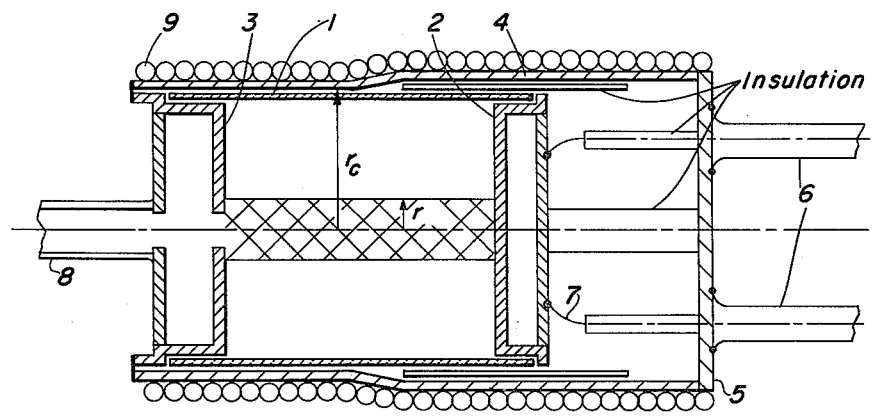
FIGURE 3 is a schematic cross section of a linear discharge tube embodying our invention.

In FIGURE 3 a specific embodiment of the above generalizations is shown in schematic form. The linear ceramic tube 1 has anode 2 and cathode 3 at its ends and is surrounded by the conductive shell 4, which is electrically connected to the cathode 3. End cap 5 is electrically connected to the conductive shell 4 and to the outer conductor of the coaxial cable 6, the inner conductor 7 of which is connected to the anode 2. The reactor is evacuated and filled with a thermonuclear fuel through the conduit 8. A substantially constant longitudinal magnetic field is supplied by the solenoid 9. The parallel coaxial cables 6 connect the reactor to a capacitor bank through massive switching means (not shown). No means for ionizing the fuel are required, as it will ionize and break down under the influence of the large potential applied between electrodes 2 and 3. However, a small spark gap in parallel with such electrodes or RF excitation by a separate solenoid may be used to speed up such ionization.

The embodiment of FIGURE 3 has the following design parameters:

| | |
|---|---|
| I.D. of tube 1 | 1 meter. |
| Length of tube 1 | 1 meter. |
| Bank capacitance, C | 500 μfd. |
| Initial voltage on capacitor, $V_0$ | 50 kilovolts. |
| Line inductance, $L_e$ | 0.05 μh. |
| Longitudinal magnetic flux density | 1300 gauss. |
| Filling pressure of deuterium | 0.1 micron Hg. |

The following characteristics are calculable:

| | |
|---|---|
| Pinch radius, $r$ (from balance of magnetic pressures $B^2/8\pi$ and material pressure $nkT$) | 0.35 meter. |
| Reactor inductance, $L_p$, at peak of initial current rise | 0.2 μh. |
| $L_p = l\mu_0/2\pi \log_e(r_c/r)$ where $l=$ comon length of coaxial conductors and $r_c=$ radius of conducting shell) | |
| Mean reactor inductance during initial current rise | 0.1 μh. |
| $\tau_b$, period of initial current $i_0$ | 54.5 μsec. |
| $(=2\pi\sqrt{(L_e+L_p)C})$ | |
| Rise time of initial current $(\tau_b/4)$ | 13.5 μsec. |
| Maximum value of initial current | 2¼ × 10⁶ amp. |

$$\left(\simeq \sqrt{C/L}\,V_0 = \sqrt{\frac{5 \times 10^{-4}f}{2.5 \times 10^{-7}h}}\,50\text{ kv.}\right)$$

To calculate the decay period $\tau_p$ of the trapped current, it is first necessary to determine $\rho$, the resistivity of the plasma outside the pinch. This can be done with the aid of the formula set forth by Lyman Spitzer, Jr., at p. 84 of Physics of Fully Ionized Gases (Interscience Publishers: New York, 1950):

$$\rho = 6.53 \times 10^3 \frac{\log_e \Lambda}{T^{3/2}}\text{ (ohm-cm.)}$$

In this equation, T is the absolute temperature of the gas while $\log_e \Lambda$ is a slowly varying function of such temperature and the density of the gas, and may be determined from the considerations in Chapter 5 of Spitzer, op. cit., leading up to the table on p. 73. Under the conditions described, a minimum of about 1% of the gas will be left outside the pinch. With this gas ionized to an average kinetic temperature of 10 e.v., the conductivity $\rho$ is equal to about $2 \times 10^{-3}$ ohm-cm. or $2 \times 10^{-5}$ ohm-meter. The approximate decay period is then $$\tau_p = \frac{\mu_0 r^2}{\rho} = \frac{4\pi \times 10^{-7}\text{ henries/meter} \times (1\text{ meter})^2}{2 \times 10^{-5}\text{ ohm-meter}}$$

$$= 15 \times 10^{-3}\text{ second}$$

It can be shown that this period is equivalent to that derived with the usual circuit parameters, $L/R$, where R now equals the sum of the resistance of the pinched part of the plasma and the resistance of the plasma surface external to the pinch.

With such a decay period of 15,000 microseconds, effective current trapping will occur and the relatively cool external plasma provides a very long containment time. Even if the external plasma temperature falls to only 1 e.v., the decay period is about 500 microseconds, still a conveniently long time to accomplish intermixing heating.

As indicated above, the fraction of capacitor energy $W_{co}$ trapped in the plasma is $$W_p = \frac{L_p}{L_p + L_e}W_{co} = \frac{0.2}{0.2 + 0.05}W_{co} = 0.8W_{co}$$

In the operation of the illustrated embodiment $$W_{co} = \frac{1}{2}CV_0^2 = 6.25 \times 10^5\text{ joules}$$

Eighty percent of this or $5.0 \times 10^5$ joules having a kinetic equivalent of $3.125 \times 10^{21}$ k.e.v. is trapped in the plasma. Assuming that only 20% of this is not lost by heat conduction and radiation of one sort or another, about $6 \times 10^{20}$ k.e.v. are available for thermalization, i.e., distribution among the pinched plasma particles. Filling the space indicated with deuterium at 0.1 micron results in a total of about $1.0 \times 10^{19}$ particles, ions and electrons included. It is apparent that the average energy available per particle is about 60 k.e.v.

$$\left(\frac{6 \times 10^{20}\text{ k.e.v. total}}{1 \times 10^{19}\text{ particles}}\right)$$

or the pinched plasma temperature is about $7 \times 10^{8°}$ K., adequate not only to provide a high rate of thermonuclear reaction, but higher than both the 4 k.e.v. minimum necessary to obtain surplus reaction energy when Brehmsstrahlung losses and the energy of escaping neutrons are deducted for (D, D) reactions and the 35 k.e.v. minimum necessary for (D, T) reactions under the same conditions, as indicated by Post in Rev. of Mod. Phys. 28, 338, 344 (July 1956).

Figure 4:
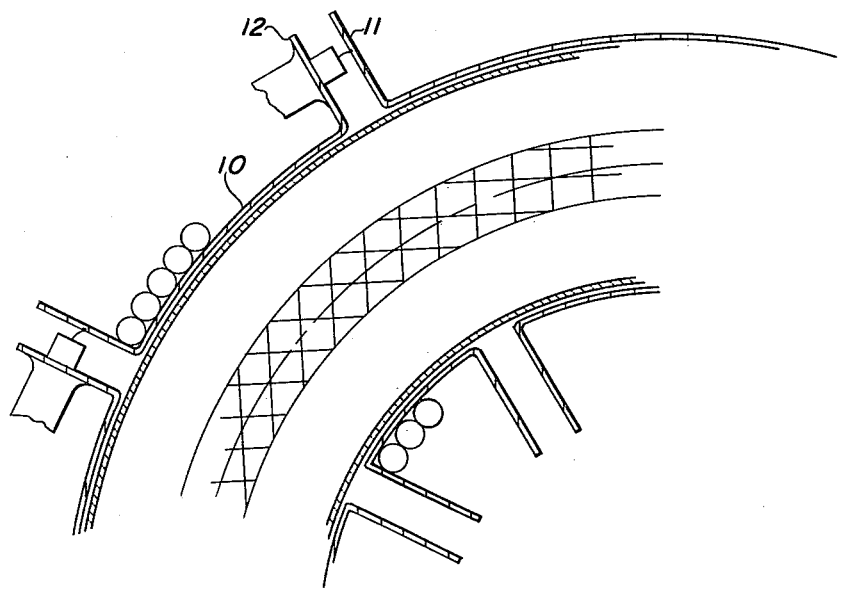
FIGURE 4 is a schematic cross section of a toroidal discharge tube employing the invention herein disclosed.

FIGURE 4 is a schematic expansion of the embodiment of FIGURE 3 into a toroidal geometry. Each section may be one meter in mean circumference and one meter in diameter (minor). There are 12 sections in the complete torus, each section having a separate feed point for connection to a separate power supply having the same capacitance, initial voltage and line inductance as in FIGURE 3. The longitudinal magnetic field is supplied by a common solenoid for the entire torus. The conducting shell is broken up into a series of separated segments 10, each fed at its ends from a pair of capacitor banks. Adjacent ends 11 and 12 of such ring segments 10 are spaced as closely as is possible consistent with insulation capabilities.

The main advantage of such a toroidal structure over the linear reactor of FIGURE 3 is that it avoids the type of conductive end losses inherent in the latter. The advantage of feeding the conducting shell 10 from a number of points rather than feeding the whole shell at a single point is that in the latter case all of the reactor inductance is coupled into the driving circuit, thereby increasing its period $\tau_b$ relative to that of any entrapped current $\tau_p$. The longer time period permits collapse of the $B_0$ field and thus militates against the entrapment effect. In the case of multiple feeding of a number of electrically separated sections, each section may be considered a separate coaxial line, even though only one common discharge current flows in the plasma. Only a proportionate share of the total pinch inductance is reflected into the driving circuit and the current rise time is kept short enough to maximize the entrapment effect.

It is also possible to demonstrate a net gain in electrical energy from the above-described system. With a 60 k.e.v. average particle energy in the 0.1 micron deuterium filling and a containment time of 15,000 microseconds, the maximum energy liberated per section of the torus will be:

$$E^M = \tfrac{1}{2} n^2 (\overline{\sigma V}) V \Delta t \times W$$

where $n$ = deuterium particle density in the pinched plasma
 = starting particle density × compression ratio
 = $0.5 \times 10^{19}$ d./cc. × $(1/.35)^2$
 = $4 \times 10^{19}$ d./cc.
$\overline{\sigma V}$ = average product of cross section and ion velocity at attained temperature
 = $1 \times 10^{-17}$ cc./sec. (Post, op. cit., p. 341)
$V$ = pinch volume
 = $\pi (50 \text{ cm.})^2 \times 100$ cm.
 = $7.86 \times 10^5$ cc.
$\Delta t$ = containment time
 = 0.015 sec.
$W$ = energy liberated per reaction in form of charged particles
 = 2.4 m.e.v. = $3.84 \times 10^{-13}$ joules.

Thus $$E^M = \tfrac{1}{2} \times 16 \times 10^{38} \times 10^{-17} \times 1.5 \times 10^{-2} \times 3.84 \times 10^{-13}$$
$$= 4.6 \times 10^7 \text{ joules}$$

Since the pinch will be slowly expanding against its magnetic field during the (D,D) reactions, thereby lowering the average energy of the unreacted particles (assuming inadequate time for collision-sharing of energy by the highly energetic reaction products), the above energy release may be somewhat lowered by the lower cross sections during the later stages of expansion. Pessimistically assuming that only 10% of the above is made available, there is still about $5 \times 10^6$ joules released as charged particle energy. We now proceed to demonstrate how this energy is returned to the electrical system, together with a share of the $5 \times 10^5$ joules imparted to plasma and fields by such system. In this calculation, the minor amount of energy stored in the low strength 1300 gauss $B_z$ field (~5300 joules) is neglected as trivial.

Ignoring the minor difference between the inside radii of the return conductor and the insulating tube liner, the formation of the pinch results in an increased kinetic energy content $W_1$ over the original energy $W_0$ in the plasma. Since the compression occurs too fast to transfer any heat, it is adiabatic and $$TV^{\delta-1} = \text{constant}$$

where $T$ = temperature
$V$ = volume
$\delta = C_p/C_v = 5/3$ for thin monatomic gases such as dissociated deuterium.

Thus $$T_1/T_0 = (V_0/V_1)^{(\delta-1)} = (r_0/r_1)^{2(\delta-1)} = (r_0/r_1)^{4/3}$$

where subscripts 0 and 1 indicate the pre-pinch condition ($r_0 \equiv r_c$ and $r_1 \equiv$ the plasma radius $r$) and the pinched condition of the plasma, respectively. Then, since the kinetic energy of the plasma is proportional to its absolute temperature, $$W_1 = W_0 (r_0/r_1)^{4/3} = 4 W_0$$

After the nuclear reactions in the plasma, its energy increase by $\Delta W$ to $W_2$:

$$W_2 = W_1 + \Delta W$$

The pinched plasma then expands adiabatically to the radius $r_1$, losing energy to the electrical system by decreasing the intensity of the magnetic field and thus decreasing its own energy content to a new value $W_3$:

$$W_3 = W_2 (r_1/r_0)^{4/3}$$
$$= [W_0 (r_0/r_1)^{4/3} + \Delta W](r_1/r_0)^{4/3}$$
$$= W_0 + \Delta W (r_1/r_0)^{4/3}$$

The external energy gain $W$ by the electrical system is the energy returned during expansion, $W_2 - W_3$, less the energy supplied for compression, $W_1 - W_0$, or $$W = \Delta W - \Delta W (r_1/r_0)^{4/3}$$
$$= \Delta W (1 - .25)$$
$$= .75 \Delta W$$

In the above example, where it was calculated that $5 \times 10^6$ joules would be thus available, the gain is $$W = 3.75 \times 10^6 \text{ joules}$$

Deducting the aforementioned conduction and radiation losses of $4 \times 10^5$ joules, the net gain is in excess of $3 \times 10^6$ joules or about one kilowatt/hour. With such a gain in 0.015 second, the power output is $200 \times 10^6$ watts or 200 megawatts.

As indicated above, copious quantities of neutrons have been produced with apparatus of the type described. The present inventors are not prepared to state that they have disclosed a net power-producing thermonuclear reactor, or even a thermonuclear reactor as above designed. Such statements cannot be made until further experimental work yields sufficiently high neutron counts to establish beyond peradventure the attainment of thermonuclear temperatures and concomitant reaction rates. However, the present inventors do believe that they have discovered a principle of design and operation which will be useful with the apparatus in which such temperatures and reaction rates are obtained, and have demonstrated complete apparatus and operating methods whereby net electrical power may be obtained from such apparatus.

What is claimed is:

1. An improved method of obtaining fusion reactions with the release of energetic neutrons comprising the steps of confining a thermonuclear fuel within a reactor consisting of a gas-tight container including a non-conducting tube surrounded by a conductive shell to form a coaxial line, providing an essentially constant magnetic field along the common axis of said tube and said shell, and coupling said coaxial line to a driving circuit consisting of a capacitor bank of low capacitance charged to a high voltage and leads of low resistance and inductance to ionize said fuel, inducing a pinched discharge current therein which compresses said magnetic field and causes current entrapment within said ionized fuel, crowbarring, short-circuiting or isolating said pinched discharge current by providing the parameters L, C, $\rho$ and $r$ with such values that the ringing period of the external circuit, $\tau_b$, is less than the time constant of decay of the pinched plasma current, $$\frac{\mu_0 r^2}{\rho}$$

where $\tau_b = 2\pi\sqrt{LC}$, L being the combined series inductance of the external circuit and said reactor and C being the capacitance of said external source of energy, $\mu_0 = 4\pi \times 10^{-7}$ henries/meter, $r$=the inside radius of said container, and $\rho$=resistivity of said ionized fuel external to the central current-carrying sheath formed by connecting said external source of energy to said reactor, said entrapped current preventing the premature expansion of said pinched discharge to the walls of said container and thereby allowing inter-diffusion of said trapped magnetic field and the azimuthal magnetic field of said discharge current to increase the energy of said pinched discharge.

2. An electrical apparatus comprising a substantially cylindrical ceramic tube closed upon itself in the form of a torus, a substantially cylindrical conducting shell closed upon itself in the form of a torus and surrounding said ceramic tube, said conducting shell consisting of a multiplicity of conducting ring segments insulated from each other and spaced in sequence about said torus with one end of each segment adjacent a preceding segment and its other end adjacent a subsequent segment, means for vacuuming said tube and for subsequent introducing thermonuclear fuel therein, a multiplicity of power supplies each of which includes a charged condenser bank, a coaxial cable, and a switch in said cable, each of said power supplies having the same capacitance, initial voltage and line inductance, one each of said power supplies being connected across adjacent ends of said conductive segments by means of said coaxial cables such that said conductive segments are connected in series for ionizing said fuel within said torus and for forming a pinched discharge within said container, a coil positioned on the outer circumference of said conducting shell for providing an axial magnetic field within the container when energized for stabilizing said pinch, said condensers, coaxial cables and conducting segments having capacitive and inductive values respectively in which the multiplication product of said capacitance and inductance is relatively low such that a transient oscillatory current flows from said condensers and rises to a maximum rapidly when said switches are closed to thereby ionize the fuel within said tube outside of said pinch to provide circulating trapped currents therein while said transient oscillatory condenser current subsequently decays rapidly, said container having a relatively large cross section and radius whereby the inductive decay time constant $$\frac{\mu_0 r^2}{\rho}$$

where $\mu_0 = 4\pi \times 10^{-7}$ henries/meter, and $\rho$=resistivity of the ionized fuel external to the central current carrying sheath formed within the container in ohms-meter, of said trapped current is relatively large and said circulating trapped currents decay much slower than said oscillatory condenser current whereby both the axial magnetic field and the magnetic field associated with the plasma current are entrapped by the slowly decaying circulating current and are permitted to expand only slowly out of the pinch thereby resulting in heating of the plasma by the magnetic field during substantially the total period of their joint existence.

3. Apparatus as in claim 2 in which each of said conductive segments has a mean circumference of 1 meter and a minor diameter of 1 meter, in which said conductive shell consists of 12 conductive segments and in which each of said power supplies has a capacitance of 500 microfarads, a voltage of 50 kilovolts and a line inductance of .05 microhenries

References Cited in the file of this patent

UNITED STATES PATENTS

| | | |
|---|---|---|
| 2,868,991 | Josephson et al. | Jan. 13, 1959 |
| 2,910,414 | Spitzer | Oct. 27, 1959 |
| 2,946,914 | Colgate et al. | July 26, 1960 |

OTHER REFERENCES

NYO–7899, The Proposed Model C Stellarator Facility, Apr. 29, 1957. Technical Information Service Extension, Oak Ridge, Tenn. Pages 1–32. Copy in Div. 46.

J. Applied Physics 28, 519–521, May 1957.

Nature, Vol. 181, Jan. 25, 1958, pp. 222–233.

"Atomic Industry Reporter, News and Analysis," Official Text, Section 1958, Library No. TK 9001 A7, issue of Jan. 29, 1958, pages 54:5–54:11.